Jan. 30, 1962 R. V. GARVER 3,019,400

REVERSED SEMICONDUCTOR MICROWAVE SWITCH

Filed Jan. 27, 1959

INVENTOR
ROBERT V. GARVER
BY S. J. Rotondi, A. J. Dupont, F. E. McGee & N. Caso

United States Patent Office 3,019,400
Patented Jan. 30, 1962

3,019,400

REVERSED SEMICONDUCTOR MICROWAVE SWITCH

Robert V. Garver, Silver Spring, Md., assignor to the United States of America as represented by the Secretary of the Army Filed Jan. 27, 1959, Ser. No. 789,465
2 Claims. (Cl. 333—73)
(Granted under Title 35, U.S. Code (1952), sec. 266)

The invention described herein may be manufactured and used by or for the Government for governmental purposes without the payment to me of any royalty thereon.

This invention relates generally to microwave switching, and more particularly to a reversed type of microwave switch employing a semiconductor diode.

In application Serial No. 656,736, filed May 2, 1957 by Armistead et al., an improved form of microwave semiconductor switch was disclosed which employs n-type germanium for the semiconductor diode. It was pointed out that the use of n-type germanium permits switching and modulation at amazingly high speeds, with considerably greater isolation than provided by other semiconductors. In a construction of a microwave switch in accordance with the Armistead application, an n-type germanium diode is placed in the center of a waveguide and means are employed for applying a voltage to the diode. When the diode is biased to cutoff, microwave energy incident thereon is reflected so that the switch is "off"; when the diode is biased to conduction, on the other hand, microwave energy propagates normally through the waveguide so that the switch is "on." There is a current flow for the "on" condition and substantially no current flow for the "off" condition. Thus, if it is desired to have a switch which is normally "on" and is pulsed "off," a continuous current flow is required through the diode. The requirement of this continuous current flow has two important disadvantages. First, a standby source of power which is continuously drained is necessary, and second, the heating of the diode by this continuous current flow causes deterioration of diodes designed for high power switching.

Accordingly, it is the object of this invention to provide a normally "on" microwave semiconductor switch employing a semiconductor diode, preferably of n-type germanium which requires no continuous current flow and draws power only when the switch is pulsed "off."

In a typical embodiment of the present invention, this object is accomplished by means of two perpendicularly disposed tuning posts incorporated in adjacent sides of a cross section of a rectangular waveguide. A point contact n-type germanium diode is connected between the two posts and arranged in cooperation therewith so that when the diode is cut off, the arrangement of the posts is such that energy propagates through the waveguide normally; but when the diode acts as a short circuit the arrangement of the posts is such that they become resonant in the waveguide at a given frequency, thereby reflecting practically all of the resonant frequency energy incident thereon. For this type of reverse semiconductor switch at a frequency of about 9,000 megacycles, the insertion loss in the "on" position of the switch is less than 0.2 decibel, while in the "off" condition, when the inductive and capacitative posts are resonant in the waveguide, the transmitted microwave power passed by the switch is reduced by 20 decibels.

The specific nature of the invention, as well as other objects, uses, and advantages thereof, will clearly appear from the following description and from the accompanying drawing, in which.

Figure 1:
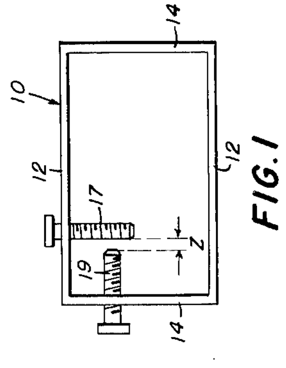
FIGS. 1 and 2 are end views of a rectangular waveguide showing how two posts may be adjusted at a waveguide cross section to provide operation in accordance with the invention.

The basic theory of operation of the microwave switch in accordance with the invention may be explained by reference to FIGS. 1 and 2. If a horizontal post, such as 19 in FIGS. 1 and 2, is inserted through the short side 14 of a rectangular waveguide 10, and a vertical post, such as 17, is inserted through the long side 12 at substantially the same cross section of the waveguide 10, it will be found that for some arrangement of the horizontal post 19 and the vertical post 17 resonance will occur at the waveguide cross section so as to cause reflection of substantially all of the energy in a given frequency range which is incident thereon.

The above theory is employed in designing a normally "on" microwave semiconductor switch in accordance with the invention. It was found that the posts 17 and 19 could be so constructed and arranged in cooperation with each other that when they are almost touching, as shown in FIG. 1, microwave energy propagates through the waveguide substantially normally, but when the posts 17 and 19 are moved to be touching, as shown in FIG. 2, resonance occurs at the waveguide cross section, thereby causing reflection of substantially all of the resonant frequency energy incident thereon. The construction and arrangement of the posts 17 and 19 in the waveguide 10 which achieve this type of operation may be determined either by mathematical techniques, or by simple experimentation. Bandwidth and isolation, which are inversely related to each other, are chiefly dependent on the post diameters.

Figure 2:
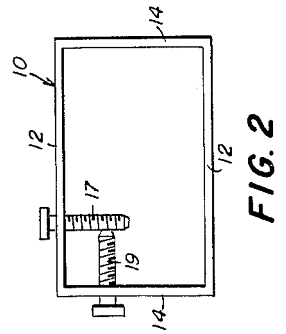
Figure 3:
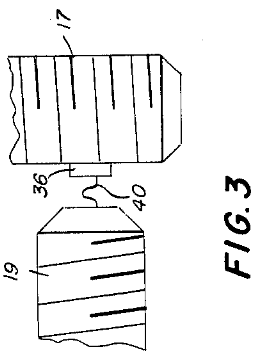
FIG. 3 is an enlarged view of the ends of the posts of FIG. 1 showing how a semiconductor diode may be interposed therebetween in accordance with the invention.

Once an arrangement of the posts 17 and 19 is found which provides the above-described operation, the posts 17 and 19 are set almost touching as shown in FIG. 1 and a n-type germanium diode comprising a germanium body 36 and a metal contact whisker 40 is then interposed between the posts 17 and 19 as shown in FIG. 3. When the diode is biased to cut off, it will be understood that substantially normal propagation of microwave energy is obtained through the waveguide 10. However, when the diode is biased so that it acts as a shortcircuit, the arrangement of the posts for all practical purposes is effectively as shown in FIG. 2, since the shortcircuited diode effectively connects the posts 17 and 19 together, thereby providing resonance at the cross section. Since the diode draws no current when it is cut off, no current flow is required in the normally "on" condition of such a switch.

Figure 4:
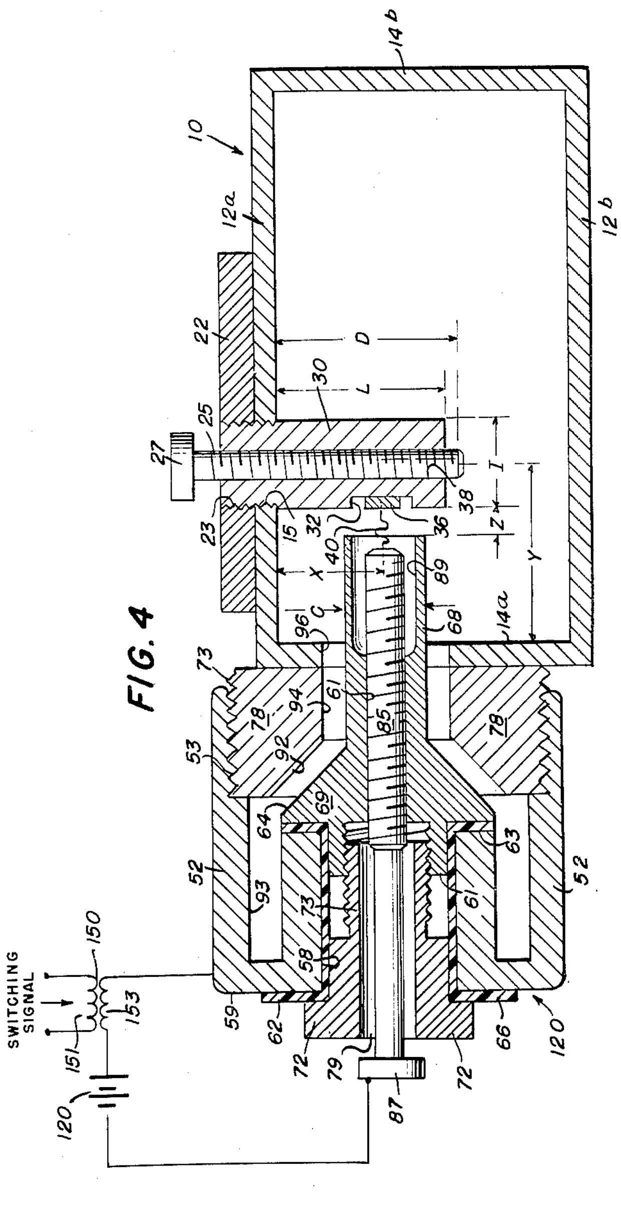
FIG. 4 is a cross-sectional and schematic end view of a rectangular waveguide incorporating the microwave semiconductor switch in accordance with the invention.

FIG. 4 illustrates a specific embodiment of the invention incorporating the theory of operation presented in accordance with FIGS. 1–3. It is to be understood, however, that various other constructions and arrangements are possible within the scope of the invention. For example, other shapes of waveguide may be used and the posts 17 and 19 need not be perpendicular as shown in FIGS. 1–3. The designation of the posts as "almost touching" in this application is intended to refer to a suitable spacing between the posts across which a semiconductor diode is interposed. This spacing or the size of the diode are not critical. The important feature is that the posts have substantially no effect on propagation through the waveguide when the diode is cut off, while when the diode is substantially shortcircuited the posts become resonant at some predetermined frequency.

For a particular embodiment those skilled in the art will readily be able to choose the proper construction and arrangement of the posts and the semiconductor diode to achieve switching operation in accordance with the invention.

In the exemplary embodiment of FIG. 4, a rectangular waveguide 10 having short sides 14*a* and 14*b* and long sides 12*a* and 12*b* is adapted to be excited by microwave energy in the $TE_{10}$ mode. A flat supporting member 22 is mounted on the side 12*a* of the waveguide 10 by any suitable means. Aligned threaded bores 23 and 15 in the support member 22 and the side 12*a*, respectively, receive a cylindrical vertical post 30 threaded therein. The vertical post 30 has a longitudinal threaded bore 38 through which is inserted a vertical tuning screw 25 having a manual tuning head 27. The vertical post 30 has a recessed portion 32 on one side in which a germanium body 36 of n-type germanium is mounted by any suitable means. An n-type germanium body is used because of its very superior switching performance, but it is to be understood that other semiconductors could be employed if desired.

A cylindrical support member 78 having an external thread 73 is suitably mounted on the short side 14*a* of the waveguide 10. A coaxial longitudinal bore 94 extending partially through the support member 78 is aligned with a bore 96 in the short side 14*a*. The bore 94 is met at its end opposite the side 14*a* by a coaxial tapered bore 92 extending from the opposite side of the support member 78. A cup member 52 is threaded on the support member 78 by means of an internal thread 53 at its open end engaging the external thread 73 of the support member 78. A coaxial cylindrical projection 59 having a coaxial cylindrical bore 58 passing therethrough depends into the cup member 52 from the base 59 to a position just short of the tapered bore 92 of the support member 78. A cylindrical insulating bushing 62 fitting in the bore 58 has an annular shoulder 63 at one end abutting the cylindrical projection 59 and an annular shoulder 62 at the other end abutting the base 59.

A cylindrical member 72 having a coaxial bore 79 and an externally threaded reduced portion 73 at one end is inserted in the insulating bushing 62 with its shoulder 78 abutting the shoulder 66 of the insulating bushing 62. A cylindrical horizontal member 69 has a conical portion 64 which abuts the shoulder 63 at its periphery and whose sides are parallel and in spaced opposed relation to the sides of the tapered bore 92. From the conical portion 64 depends a reduced coaxial cylindrical projection 61 extending into the insulating bushing 62 and having a coaxial threaded bore therein engaging the external threads of the reduced portion 73 of the member 72. Depending from the narrow end of the conical portion 69 is a cylindrical horizontal post 68 passing into the waveguide 10 coaxially through the bores 94 and 96. The diameter of the horizontal post 68 is significantly smaller than the diameter of the bores 94 and 96 so as to leave an annular space therebetween.

The annular space between the horizontal post 68 and the bores 94 and 96, the conical annular space between the conical portion 64 and the tapered bore 92, and the annular space between the cup projection 59 and the sides of the cup member 52, are dimensioned in accordance with well known techniques so that they serve as an R-F choke to reduce losses produced by the opening effectively resulting because of the presence of the insulating bushing 62. In the conventional form of choke-flange joint an R-F choke is similarly formed to reduce losses resulting from imperfect joints. The insulating bushing 62 is necessary to electrically insulate the capacitive tuning post 68 from the waveguide 10.

A horizontal tuning screw 85 having a manual tuning head 87 is inserted in a threaded bore 61 of the conical portion 69 and the horizontal post 68 and extends through the horizontal post 68 almost to the end thereof. The end of the horizontal post 68 in the waveguide 10 has a coaxial bore 89 which is conveniently provided to have a larger diameter than that of the horizontal tuning screw 85. A contact whisker 40 is soldered at one end in a small hole in the tuning screw 85 and at the other end forms a pressure point contact with the germanium body 36 mounted in the recess 32 of the side of the vertical post 30 facing the tuning screw 85. The whisker 40 and the germanium body 36 thus form a point contact semiconductor diode between the vertical post 30 and the horizontal post 68.

Electrically connected between the tuning screw 87 and some convenient portion connected to the waveguide structure, such as the cup member 52, is a negative bias battery 120 in series with the secondary winding 153 of a transformer 150. A positive switching voltage is adapted to be applied in series with the battery 150 by applying a suitable switching signal to the secondary winding 151 of the transformer 150. The voltage of the bias battery 120 is chosen so that in the absence of a switching signal the diode formed by the whisker 40 and the germanium body 36 is substantially cut off. The switching signal and the transformer 150 are chosen so that upon the application of the switching signal to the primary winding voltage 151, a positive voltage is applied in series with the battery 120 which causes sufficient current to flow in the diode 40, 36 to cause it to act as a short circuit.

In FIG. 4, certain important dimensions are indicated by means of the letters D, L, X, Y and Z. In a specific construction of the invention in accordance with FIG. 4 for use with .40 by .90 inch rectangular waveguide for switching about 50 milliwatts peak power at a frequency of about 9,000 megacycles, the following dimensions are employed:

| | Inch |
|---|---|
| C | 0.100 |
| I | 0.125 |
| D=L | 0.281 |
| X | 0.231 |
| Y | 0.200 |
| Z | 0.024 |

The m-type gemanium body 36 has $10^{16}$ impurity donors per cubic centimeter and the contact whisker 40 is 0.003 inch in diameter.

For this specific construction the insertion loss with the switch "on" is less than 0.2 decibel while with the switch turned "off" the transmitted power passed by the switch is reduced by 20 decibels. The bandwidth of the switch is of the order of 200 megacycles.

It will be apparent that the embodiment of the invention disclosed herein is only exemplary and that various modifications can be made in construction and arrangement within the scope of the invention as defined in the appended claims.

I claim as my invention:

1. A normally "on" microwave semiconductor switch which draws power only when turned "off" said switch comprising in combination: a section of rectangular waveguide adapted to be excited in the $TE_{10}$ mode, a first post inserted into said waveguide perpendicularly through one of its long sides, a second post inserted into said waveguide perpendicularly through one of its short sides at the same cross section as said first post, said posts thereby being mutually perpendicular, means electrically insulating said posts from one another, said posts having portions which almost touch, a semiconductor diode interposed between said portions, means applying a bias voltage between said posts to cut off said diode, and means for applying a voltage between said posts to cause said diode to act as substantially a short circuit, said posts being so constructed and arranged that when said diode is cut off microwave energy propagates through said waveguide substantially normally, and when said diode is substantially shortcircuited said posts become resonant in said waveguide at said cross section for a predetermined microwave frequency, thereby reflecting substantially all of the resonant frequency energy incident thereon.

2. A normally "on" microwave semiconductor switch draws power only when turned "off," said switch comprising in combination: a section of rectangular waveguide adapted to be excited in the $TE_{10}$ mode, a first post inserted into said waveguide perpendicularly through one of its long sides, a second post inserted into said waveguide perpendicularly through one of its short sides at the same cross section as said first post, said posts thereby being mutually perpendicular, means electrically insulating said posts from one another, said posts having portions which almost touch, and an n-type germanium point contact diode interposed between said portions, said diode comprising an n-type germanium body and a contact whisker making a pressure contact with said body, said contact whisker being electrically connected to one post, and said body being electrically connected to the other post, means applying a negative bias voltage between said posts to cut off said diode, and means for applying a positive voltage in series with said last mentioned means to overcome said negative bias and apply a sufficient positive voltage between said posts to cause said diode to act as substantially a short circuit, said posts being so constructed and arranged that when said diode is cut off microwave energy propagates through said waveguide substantially normally, and when said diode is substantially short-circuited said posts become resonant in said waveguide at said cross section for a predetermined microwave frequency, thereby reflecting substantially all of the resonant frequency energy incident thereon.

References Cited in the file of this patent

UNITED STATES PATENTS

| | | |
|---|---|---|
| 2,480,189 | Irving | Aug. 30, 1949 |
| 2,520,008 | King | Aug. 22, 1950 |
| 2,522,861 | Cork | Sept. 19, 1950 |
| 2,592,551 | Flarity | Apr. 15, 1952 |
| 2,668,276 | Shooley | Feb. 2, 1954 |
| 2,903,660 | Scott | Sept. 8, 1959 |
| 2,910,659 | Caroselli | Oct. 27, 1959 |
| 2,928,056 | Lampert | Mar. 8, 1960 |

OTHER REFERENCES

Armistead et al.: Prc. IRE, vol. 44, p. 1875, December 1956.

Graver et al.: IRE Transactions on Microwave Theory and Techniques, vol. MTT–6, No. 4, pp. 378–383, October 1958.